US009805686B2

(12) United States Patent
Jung et al.

(10) Patent No.: US 9,805,686 B2
(45) Date of Patent: Oct. 31, 2017

(54) DISPLAY DEVICE AND INTEGRATED CIRCUIT CHIP

(71) Applicant: Samsung Display Co., Ltd., Yongin, Gyeonggi-Do (KR)

(72) Inventors: Sung Gon Jung, Suwon-si (KR); Jee-Hoon Jeon, Hwaseong-si (KR); Min-Kyu Park, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 161 days.

(21) Appl. No.: 14/298,642

(22) Filed: Jun. 6, 2014

(65) Prior Publication Data

US 2015/0206276 A1 Jul. 23, 2015

(30) Foreign Application Priority Data

Jan. 20, 2014 (KR) ........................ 10-2014-0006915

(51) Int. Cl.
*G06T 1/60* (2006.01)
*G09G 5/00* (2006.01)
*G06T 3/40* (2006.01)

(52) U.S. Cl.
CPC ............. *G09G 5/00* (2013.01); *G06T 3/4007* (2013.01); *G06T 2200/28* (2013.01)

(58) Field of Classification Search
CPC ................. G09G 5/00; G06T 3/4007
See application file for complete search history.

(56) References Cited

U.S. PATENT DOCUMENTS 6,496,609 B1 * 12/2002 Walter ................. G06T 3/4007
  358/525
6,587,117 B1 * 7/2003 Wright ................. G06T 11/001
  345/501

(Continued)

FOREIGN PATENT DOCUMENTS

JP   2010-002503 A   1/2010
JP   2011-118361 A   6/2011

(Continued)

OTHER PUBLICATIONS

From Intel® Developer Services, Using MMX™ Instructions to Implement Bilinear Interpolation of Video RGB Values, Mar. 1996, www.intel.com/IDS, p. 1-22.*

*Primary Examiner* — Gregory J Tryder
*Assistant Examiner* — Yuehan Wang
(74) *Attorney, Agent, or Firm* — Knobbe Martens Olson & Bear LLP

(57) ABSTRACT

A display device is disclosed. The display device includes: a plurality of pixels; a memory storing a lookup table including compensation values for pixels at specific locations of the display. The lookup table also stores compensation values obtained by a bilinear compensation method. The display also includes a data compensator calculating the compensation values corresponding to a location where an image signal is displayed using the compensation values and substitution values stored in the lookup table. The substitution values are obtained by bit-shifting the compensation values acquired by bilinear compensation method. The display device avoids the need to use large and slow divider circuits used in ICs implementing bilinear compensation method.

19 Claims, 3 Drawing Sheets

(56) References Cited

U.S. PATENT DOCUMENTS

| | | |
|---|---|---|
| 6,952,287 B2 | 10/2005 | Aoki |
| 7,839,395 B2 | 11/2010 | Chung et al. |
| 7,839,457 B2 | 11/2010 | Yamagata et al. |
| 8,059,070 B2 | 11/2011 | Odawara et al. |
| 2004/0133617 A1* | 7/2004 | Chen .................. G06F 9/30014 708/523 |
| 2005/0093798 A1 | 5/2005 | Kamada et al. |
| 2006/0061593 A1 | 3/2006 | Miura et al. |
| 2009/0161015 A1 | 6/2009 | Kato |
| 2011/0176732 A1* | 7/2011 | Maruyama ............. H04N 5/232 382/173 |
| 2013/0155042 A1 | 6/2013 | Ishikawa et al. |
| 2013/0169826 A1* | 7/2013 | Ferguson ............... H04N 17/02 348/191 |

FOREIGN PATENT DOCUMENTS

| | | |
|---|---|---|
| JP | 5174837 B2 | 1/2013 |
| KR | 10-2008-0101262 A | 11/2008 |
| KR | 10-2011-0064494 A | 6/2011 |
| KR | 10-2011-0078792 A | 7/2011 |
| KR | 10-2012-0010009 A | 2/2012 |
| KR | 10-2013-0078509 A | 7/2013 |

\* cited by examiner

DISPLAY DEVICE AND INTEGRATED CIRCUIT CHIP

CROSS-REFERENCE TO RELATED APPLICATIONS

This application claims priority under 35 U.S.C. §119 to Korean Patent Application No. 10-2014-0006915 filed in the Korean Intellectual Property Office on Jan. 20, 2014, the entire contents of which are incorporated herein by reference.

BACKGROUND

Field

The described technology relates to a display device and an IC chip, particularly, a display device and an IC chip that can improve occurrence of mura, or image irregularities, generated due to manufacturing process.

Description of the Related Technology

A display device includes a liquid crystal display, a field emission display, a plasma display panel, and an organic light emitting device.

In general, the display device includes at least one display panel provided with a thin film transistor (TFT).

A manufacturing process of the display panel includes unit processes such as cleaning, deposition, photolithography, etching, photoresist stripping, inspection, and the like. The unit process is iteratively performed such that a thin film transistor and various electrodes are formed in the display panel. A unique gamma characteristic of the display device is determined during such a manufacturing process of the display panel.

The display device has increased in size. As the size of the display device increases, a gamma curve changes for a location in a display panel due to a process limit. When the gamma curve is changed according to locations in the display panel, a luminance difference occurs according to location even through the same data voltage is applied to the entire display panel, and the luminance difference is viewed as a spot. This is called a mura.

In order to prevent the occurrence of mura during the manufacturing process, different gamma compensation is performed for each location of the display panel. The same data voltage is applied to the entire display panel to detect an area where a spot is generated, a positive compensation value is added to a data voltage in a dark area, and a negative compensation value is applied to a data voltage in a bright area such that gamma compensation is performed. That is, the spotted area is no longer viewable because of the adjustment of the data voltage applied to the display panel.

A compensation value for the gamma compensation of the display panel may be provided in a lookup table (LUT). When compensation values of all the pixels included in the display panel are stored in the lookup table, the size of the lookup table is increased and the use amount of memory is significantly increased.

The above information disclosed in this Background section is only for enhancement of understanding of the background of the invention and it does not constitute an admission of the prior art.

SUMMARY OF CERTAIN INVENTIVE ASPECTS

In some embodiments, compensation values for pixels at specific locations are stored in a lookup table rather than storing all the pixel compensation values in the lookup table so as to reduce the amount of memory usage. Compensation values of pixels for which compensation values are not stored in the lookup table are calculated using a bilinear interpolation method.

In some embodiments, a method for calculating the compensation value with the bilinear interpolation method may be implemented in an application specific integrated circuit (ASIC). In this case, addition, subtraction, and multiplication operators may be realized by an adder or a combination of adders, but a division operator can use a divider. A divider can occupy a relatively large hardware capacity, and consume a long period of time to output a result.

In some embodiments a display device can reduce hardware capacity and improve operating speed in calculation of compensation values using a bilinear interpolation method to prevent occurrence of mura.

In one embodiment, a display device includes a plurality of pixels; a memory configured to store a lookup table of compensation values for pixels at specific locations among the plurality of pixels and substitution values for bilinear compensation values; and a data compensator configured to calculate, the bilinear compensation values corresponding to locations where an image signal is displayed, wherein the calculation is performed with a bilinear compensation method using the lookup table and the substitution values, and the substitution values are determined by a bit shift to avoid the usage of a division operator in the data compensator.

In one aspect, the data compensator includes a plurality of adders, a plurality of multipliers, and bit shifters.

In another aspect, the data compensator includes eight adders and seven multipliers.

In another aspect, the bit shifters include a first bit shifter and a second bit shifter performing 16 bit shifts; and a third bit shifter performing 32 bit shifts.

In one aspect, the data compensator performs the bilinear compensation method using the following equation:

$$g=a+(b-a)K1>>16 \text{ bit}\times x+(c-a)K2>>16 \text{ bit}\times y+(a+d-b-c)K3>>32 \text{ bit}\times xy$$

where g denotes a compensation value corresponding to a location where the image signal is displayed, a, b, c, and d denote compensation values included in the lookup table, x and y denote a location value indicating a location where the image signal is displayed, >>16 bit denotes 16 bit shifts, >>32 bit denotes 32 bit shifts, and K1, K2, and K3 are substitution values.

In another aspect, the substitution value K1 is $$K1=\frac{2^{16}}{W},$$

the substitution value K2 is $$K2=\frac{2^{16}}{H},$$

the substitution value K3 is $$K3=\frac{2^{32}}{HW},$$

where

W denotes the number of pixels arranged between two pixels respectively corresponding to a compensation value a and a compensation value b included in the lookup table, and H denotes the number of pixels arranged between two pixels corresponding to the compensation value a and a compensation value c included in the lookup table.

In one aspect, the plurality of adders include a first adder adding a first compensation value and a second compensation value; a second adder adding the first compensation value and a third compensation value; a third adder adding the first compensation value and the second compensation value; a fourth adder adding the third compensation value and a fourth compensation value; and a fifth adder adding a calculation value of the third adder and a calculation value of the fourth adder, wherein the first to fourth compensation values are a plurality of compensation values stored in the lookup table.

In another aspect, the plurality of multipliers include: a first multiplier multiplying a calculation value of the first adder by a first location value; a second multiplier multiplying the calculation value of the first multiplier by a first substitution value; a third multiplier multiplying a calculation value of the second adder by a second location value; a fourth multiplier multiplying a calculation value of the third multiplier by a second substitution value; a fifth multiplier multiplying the first location value by the second location value; a sixth multiplier multiplying a calculation value of the fifth adder by a calculation value of the fifth multiplier; and a seventh multiplier multiplying a calculation value of the sixth multiplier by a third substitution value, and the location value comprises the first location value and the second location value and the substitution value comprises the first to third substitution values.

In another aspect, the bit shifter include: a first bit shifter, 16 bit shifting a calculation value of the second multiplier; a second bit shifter, 16 bit shifting a calculation value of the fourth multiplier; and a third bit shifter, 32 bit shifting a calculation value of the seventh multiplier.

In another aspect, the plurality of adders further comprise: a sixth adder adding the first compensation value and a calculation value of the first bit shifter; a seventh adder adding a calculation value of the sixth adder and a calculation value of the second bit shifter; and an eighth adder adding a calculation value of the seventh adder and a calculation value of the third bit shifter.

In one aspect, the data compensator is provided as an integrated circuit chip.

In another aspect, the memory is provided as an electrically erasable programmable read-only memory.

In another embodiment, an integrated circuit chip is provide, wherein the integrated circuit chip includes: a plurality of adders performing addition between a plurality of compensation values stored in a lookup table; a plurality of multipliers multiplying location values by location values or by substitution values; and bit shifters bit-shifting, by a number of predetermined bits, values generated by the multipliers.

In one aspect, the plurality of adders include: a first adder adding a first compensation value and a second compensation value; a second adder adding the first compensation value and a third compensation value; a third adder adding the first compensation value and the second compensation value; a fourth adder adding the third compensation value and a fourth compensation value; and a fifth adder adding a calculation value of the third adder and a calculation value of the fourth adder, wherein the first to fourth compensation values are the plurality of compensation values stored in the lookup table.

In another aspect, the plurality of multipliers comprise: a first multiplier multiplying a calculation value of the first adder by a first location value; a second multiplier multiplying a calculation value of the first multiplier by a first substitution value; a third multiplier multiplying a calculation value of the second adder by a second location value; a fourth multiplier multiplying a calculation value of the third multiplier by a second substitution value; a fifth multiplier multiplying the first location value by the second location value; a sixth multiplier multiplying a calculation value of the fifth adder by a calculation value of the fifth multiplier; and a seventh multiplier multiplying a calculation value of the sixth multiplier by a third substitution value, and the location values comprise the first location value and the second location value and the substitution values comprises the first to third substitution values.

In one aspect the bit shifters include: a first bit shifter, 16 bit shifting a calculation value of the second multiplier; a second bit shifter, 16 bit shifting a calculation of the fourth multiplier; and a third bit shifter, 32 bit shifting a calculation value of the seventh multiplier.

In another aspect, the plurality of adders further include: a sixth adder adding the first compensation value and a calculation value of the first bit sifter; a seventh adder adding a calculation value of the sixth adder and a calculation value of the second bit shifter; and an eighth adder adding a calculation value of the seventh adder and a calculation value of the third bit shifter.

In one aspect, the number of predetermined bits is 16 and 32.

In another aspect, the bit shifters comprise a first bit-shifter, bit-shifting by 16 bits, a second bit-shifter bit-shifting by 16 bits, and a third bit-shifter, bit-shifting by 32 bits.

When compensation values for preventing occurrence of a mura during a manufacturing process are stored in the lookup table, compensation values for all the pixels may not need to be stored and therefore the use amount of memory can be reduced.

In addition, when calculating the compensation values with the bilinear interpolation method, a divider is not used so that the hardware capacity can be reduced and operating speed can be improved.

DETAILED DESCRIPTION OF CERTAIN INVENTIVE EMBODIMENTS

Figure 1:
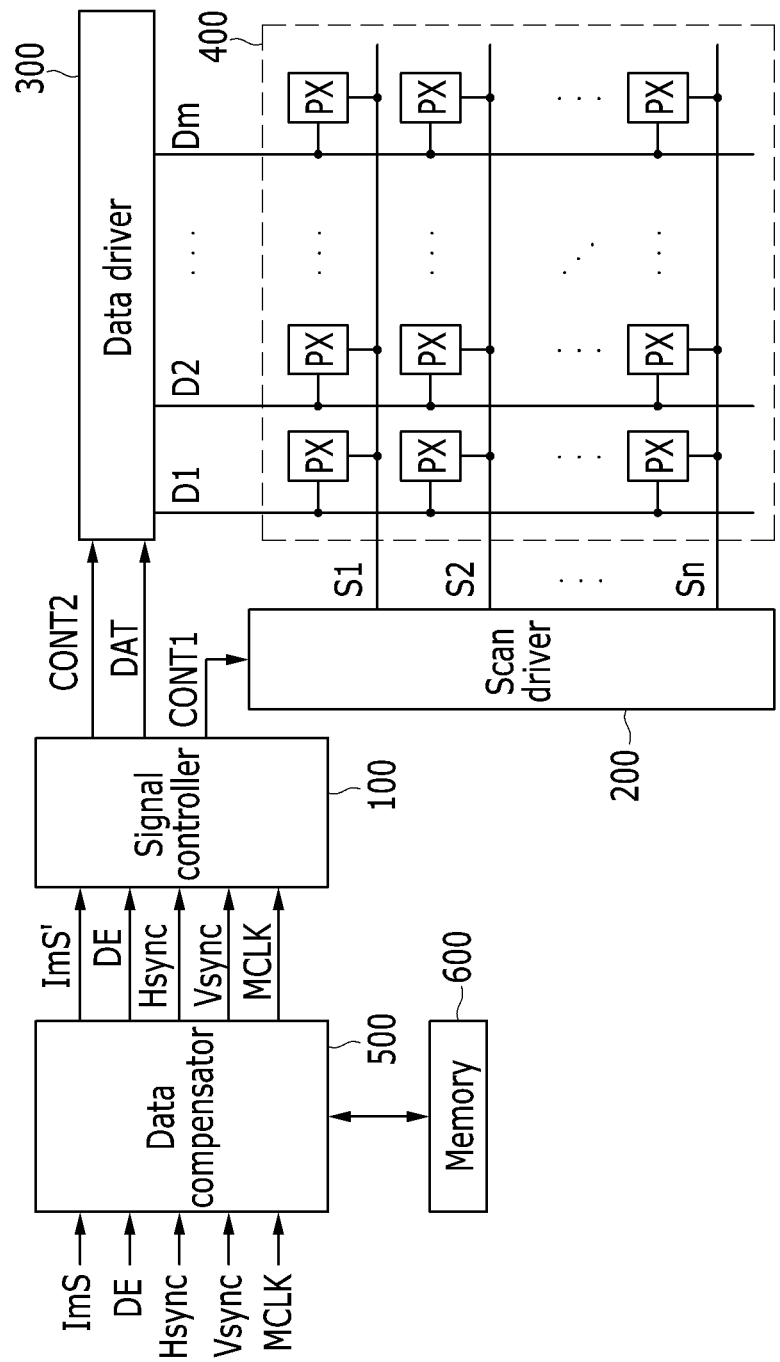
FIG. 1 is a block diagram of a display device according to an exemplary embodiment.

Exemplary embodiments will be described more fully hereinafter with reference to the accompanying drawings, in which. As those skilled in the art would realize, the described embodiments may be modified in various different ways, all without departing from the spirit or scope of the disclosure.

The drawings and description are to be regarded as illustrative in nature and not restrictiveLike reference numerals designate like elements throughout the specification.

FIG. 1 is a block diagram of a display device according to an exemplary embodiment.

Referring to FIG. 1, in some embodiments, a display device includes a signal controller 100, a scan driver 200, a data driver 300, a display unit 400, a data compensator 500, and a memory 600.

The display unit 400 includes a plurality of scan lines S1 to Sn, a plurality of data lines D1 to Dm, and a plurality of pixels PX connected to the plurality of signal lines S1 to Sn and D1 to Dm are substantially arranged in a matrix. The plurality of scan lines S1 to Sn are extended substantially in a row direction and almost parallel with each other. The plurality of data lines D1 to Dm are extended substantially in a column direction and almost parallel with each other.

The memory 600 stores a lookup table that includes a compensation value for improvement of mura generated during a manufacturing process. In some embodiments, the lookup table includes a compensation value of a pixel at a specific location rather than including compensation values of all pixels. Since compensation values for pixels at specific locations are stored in the lookup table, the use of memory 600 can be reduced.

In addition, in some embodiments, the memory 600 stores a first substitution value K1, a second substitution value K2, and a third substitution value K3 for bilinear interpolation. The first substitution value K1, the second substitution value K2, and the third substitution value K3 will be described later. The memory 600 may be provided as a non-volatile memory such as an electrically erasable programmable read-only (EEPROM) memory and the like.

In some embodiments, the data compensator 500 receives an input signal ImS and an input control signal controlling displaying of the image signal ImS input from an external device. The image signal ImS contains luminance information about each pixel of the display unit 10, and the luminance has a predetermined number, for example, $1024=2^{10}$, $256=2^8$, or $64=2^6$, of grays. Examples of input control signals include a vertical synchronization signal Vsync, a horizontal synchronization signal Hsync, a main clock signal MCLK, a data enable signal DE, and the like.

In some embodiments the data compensator 500 determines the location where an image signal ImS is displayed using the horizontal synchronizing signal Hsync, the vertical synchronization signal Vsync, and the main clock signal MCLK. The data compensator 500 reads a compensation value from the lookup table stored in the memory 600. In addition, the data compensator 500 reads a first substitution value K1, a second substitution value K2, and a third substitution value K3 for a bilinear interpolation from the memory 600. The data compensator 500 calculates a compensation value corresponding to a location where the image signal ImS is displayed with bilinear interpolation using the compensation value read from the lookup table, the first substitution value K1, the second substitution value K2, and the third substitution value K3. The data compensator 500 generates a compensation image signal ImS' by adding a calculated compensation value to the image signal ImS.

The signal controller 100 receives the compensation image signal ImS and the input control signal from the data compensator 500. The signal controller 100 appropriately processes the compensation image signal ImS' according to operating conditions of the display unit 400 and the data driver 300 based on the compensation image signal ImS, and the input control signal, and generates a scan control signal CONT1, a data control signal CONT2, and an image data signal DAT. The signal controller 100 transmits the scan control signal CONT1 to the scan driver 200. The signal controller 100 transmits the data control signal CONT2 and the image data signal DAT to the data driver 300.

The scan driver 200 is connected to the plurality of scan lines S1 to Sn, and applies a scan signal formed by combination of the gate-on voltage and the gate-off voltage to the plurality of scan lines S1 to Sn according to the scan control signal CONT1. The scan driver 200 sequentially applies the scan signal to the plurality of scan lines S1 to Sn.

The data driver 300 is connected to the plurality of data lines D1 to Dm, samples and holds the data control signal CONT2 and the input image data signal DAT, and applies a data voltage to the plurality of data lines D1 to Dm. The data driver 300 applies a data voltage having a predetermined voltage range to the plurality of data lines D1 to Dm corresponding to a scan signal of the gate-on voltage.

The data compensator 500 and the signal controller 100 are separately provided in some exemplary embodiments, but the data compensator 500 can be included in the signal controller 100. For example, the data compensator 500 can be implemented as an IC chip such as an application specific integrated circuit (ASIC), and the ASIC can combine the functions of the signal controller 100 and the functions of the data compensator 500.

Each of the above-described driving devices 100, 200, 300, 500, and 600 can be directly mounted as at least one IC chip to the display unit 400, can be mounted to a flexible printed circuit film, can be mounted to the display unit 400 as a tape carrier package (TCP), or can be integrated together with the signal lines S1 to Sn and D1 to Dm to the display unit 400.

Hereinafter, the bilinear compensation method will be described with reference to FIG. 2 and FIG. 3.

Figure 2:
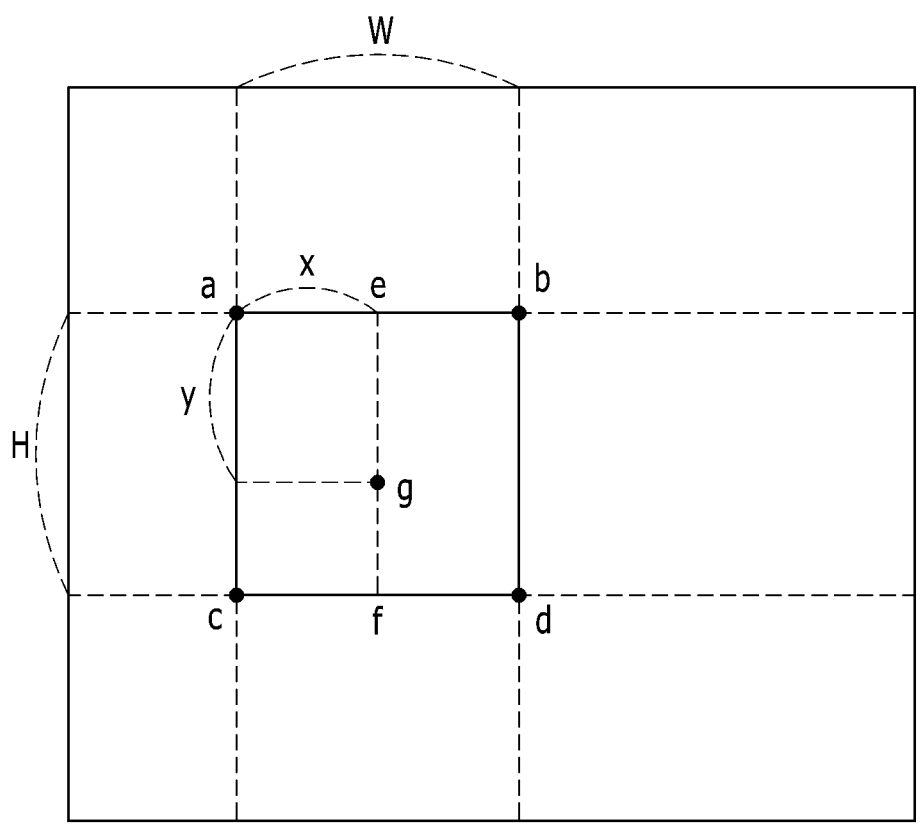
FIG. 2 is a diagram illustrating an example of a double-linear interpolation method according to an embodiment.

FIG. 2 is a diagram illustrating an example of the bilinear compensation method. FIG. 3 is a block diagram of the compensator that performs the bilinear compensation method according to an exemplary embodiment.

Figure 3:
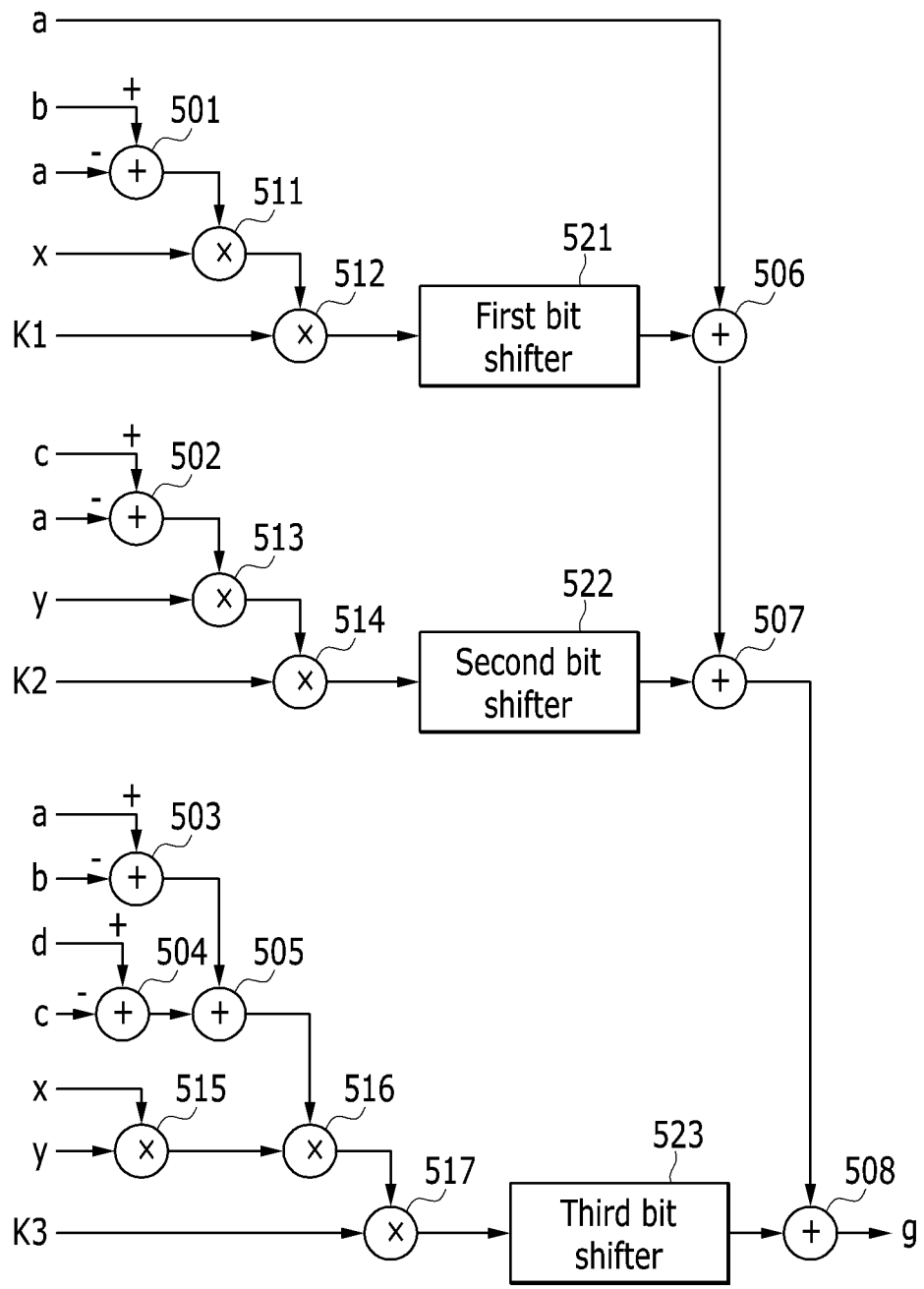
FIG. 3 is a block diagram of a data compensator configured to perform a bilinear interpolation method according to an exemplary embodiment.

Referring to FIG. 2 and FIG. 3, the lookup table stored in the memory 600 includes a compensation value for a pixel at a specific location rather than including compensation values of all pixels. Among the plurality of pixels included in the display unit 400, pixels at a specific location may be selected in a matrix format, and the compensation values included in the lookup table may be compensation values for pixels arranged in the matrix format.

As shown in FIG. 2, when the compensation values included in the lookup table are a, b, c, and d, a compensation value g is calculated. In this case, the number of pixels arranged between two pixels respectively corresponding to the compensation value a and the compensation value b is W, and the number of pixels arranged between two pixels respectively corresponding to the compensation value a and the compensation value c is H. In some embodiments, W and H are values that are predetermined in a generation process of the lookup table.

According to the bilinear compensation method, a first compensation value e between the compensation value a and the compensation value b can be calculated as given in Equation 1, a second compensation value f between the compensation value c and the compensation value d can be calculated as given in Equation 2, and a third compensation value g between the first compensation value e and the second compensation value f can be calculated as given in Equation 3.

$$c = a + \frac{b-a}{W} \times x \quad \text{(Equation 1)}$$

$$f = c + \frac{d-c}{W} \times x \quad \text{(Equation 2)}$$

$$g = e + \frac{f-e}{H} \times y \quad \text{(Equation 3)}$$

$$= \left\{ a + \frac{b-a}{W} \times x \right\} + \left\{ (c-a) + \frac{a+d-b-c}{W} \times x \right\} \times \frac{y}{H}$$

Here, x denotes the number of pixels arranged between two pixels respectively corresponding to the compensation value a and the compensation value e, and y denotes the number of pixels arranged between two pixels respectively corresponding to the compensation value e and the compensation value g. The third compensation value g is the desired compensation value. x and y are location values that determine a location of a pixel corresponding to the third compensation value g that is to be calculated with reference to a location of the pixel corresponding to the compensation value a. These locations can be calculated by determining a location where the image signal ImS is displayed using the horizontal synchronizing signal Hsync, the vertical synchronization signal Vsync, and the main clock signal MCLK.

Equation 3 can be simplified to Equation 4.

$$g = a + \frac{b-a}{W} \times x + \frac{c-a}{H} \times y + \frac{a+d-b-c}{HW} \times xy \quad \text{(Equation 4)}$$

By implementing Equation 4 with hardware, the bilinear compensation method can be implemented, for example, with an IC chip like an ASIC. In this case, Equation 4 includes a division operator. When a dividend of the division operator is not a multiple of 2, a divider should be included in the ASIC. The divider uses a relatively large hardware capacity, and a long period of time is consumed to output a result.

In Equation 4, the division operator can be eliminated using a bit shift, and the first substitution value K1, the second substitution value K2, and the third substitution value K3. The first substitution value K1, the second substitution value K2, and the third substitution value K3 can be stored in the memory 600.

Equation 5 represents the first substitution value K1 by a bit shift, Equation 6 represents the second substitution value K2 by the bit shift, and Equation 7 represents the third substitution value K3 by the bit shift.

$$\frac{b-a}{W} = (b-a) \times K1 \gg 16 \text{ bit}, K1 = \frac{2^{16}}{W} \quad \text{(Equation 5)}$$

$$\frac{c-a}{H} = (c-a) \times K2 \gg 16 \text{ bit}, K2 = \frac{2^{16}}{H} \quad \text{(Equation 6)}$$

$$\frac{a+d-b-c}{HW} = (a+d-b-c) \times K3 \gg 32 \text{ bit}, K3 = \frac{2^{32}}{HW} \quad \text{(Equation 7)}$$

Here, operator>>implies a shift operator that shifts bits. Operator>>16 bit implies 16 bit shifts and thus the bit is shifted down 16 times as much as a multiple of two. Operator>>32 bit implies 32 bit shifts and thus the bit is shifted down 32 times as much as a multiple of two.

In some embodiments, W and H are predetermined in the generation process of the lookup table, and the first substitution value K1, the second substitution value K2, and the third substitution value K3 are predetermined fixed values. Therefore, the first substitution value K1, the second substitution value K2, and the third substitution value K3 are stored in the memory 600. Rather than calculating elements 1/W, 1/H, and 1/HW each including a division operator in the integrated circuit chip, the substitution values are read from the memory 600 such that only an adder and a multiplier need be included in the integrated circuit chip.

Equation 4 can be changed to Equation 8 by a bit shift.

$$g = a + (b-a)K1 \gg 16 \text{ bit} \times x + (c-a)K2 \gg 16 \text{ bit} \times y + (a+d-b-c)K3 \gg 32 \text{ bit} \times xy \quad \text{(Equation 8)}$$

In some embodiments, as shown in FIG. 3, Equation 8 can be realized by eight adders 501 to 508, seven multipliers 511 to 517, and three bit shifters 521 to 523 in the IC chip.

That is, the data compensator 500 may include eight adders 501 to 508, seven multipliers 511 to 517, and three bit shifters 521 to 523.

The first adder 501 calculates a first calculation value by adding the compensation value b of the lookup table and a compensation value a, and transmits the first calculation value to the first multiplier 511.

The first multiplier 511 calculates a second calculation value by multiplying the first calculation value by x, and transmits the second calculation value to the second multiplier 512.

The second multiplier 512 calculates a third calculation value by multiplying the second calculation value by the first substitution value K1, and transmits the third calculation value to the first bit shifter 521.

The first bit shifter 521 calculates a fourth calculation value by 16 bit shifting the third calculation value, and transmits the fourth calculation value to the sixth adder 506.

The sixth adder 506 calculates a fifth calculation value by adding the fourth calculation value and the compensation value a of the lookup table, and transmits the fifth calculation value to the seventh adder 506.

The second adder 502 calculates a sixth calculation value by adding the compensation value c of the lookup table and the compensation value −a, and transmits the sixth calculation value to the third multiplier 513.

The third multiplier 513 calculates a seventh calculation value by multiplying the sixth calculation value by y, and transmits the seventh calculation value to the fourth multiplier 514.

The fourth multiplier 514 calculates an eighth calculation value by multiplying the seventh calculation value by the second substitution value K2, and transmits the eighth calculation value to the second bit shifter 522.

The second bit shifter 521 calculates a ninth calculation value by 16 bit shifting the eighth calculation value, and transmits the ninth calculation value to the seventh adder 507.

The seventh adder 507 calculates a tenth calculation value by adding the ninth calculation value and the fifth calculation value, and transmits the tenth calculation value to the eighth adder 508.

The third adder 503 calculates an eleventh calculation value by adding the compensation value a of the lookup table and a compensation value −b, and transmits the eleventh calculation value to the fifth adder 505.

The fourth adder 504 calculates a twelfth calculation value by adding the compensation value d of the lookup table and a compensation value −c, and transmits the twelfth calculation value to the fifth adder 505.

The fifth adder 505 calculates a thirteenth calculation value by adding the eleventh calculation value and the twelfth calculation value, and transmits the thirteenth calculation value to the sixth multiplier 516.

The fifth multiplier 515 calculates a fourteenth calculation value by multiplying x by y, and transmits the fourteenth calculation value to the sixth multiplier 516.

The sixth multiplier 516 calculates a fifteenth calculation value by multiplying the thirteenth calculation value by the fourteenth calculation value, and transmits the fifteenth calculation value to the seventh multiplier 517.

The seventh multiplier 517 calculates a sixteenth calculation value by multiplying the fifteenth calculation value by the third substitution value K3, and transmits the sixteenth calculation value to the third bit shifter 523.

The third bit shifter 523 calculates a seventeenth calculation value by 32 bit shifting the sixteenth calculation value, and transmits the seventeenth calculation value to the eighth adder 508.

The eighth adder 508 calculates an eighteenth calculation value by adding the tenth calculation value and the seventeenth calculation value, and outputs the eighteenth calculation value. The eighteenth calculation value becomes a desired third compensation value g.

As described above, when a compensation value is calculated using the bilinear compensation method, much less hardware capacity is used because a divider does not have to be included in the IC chip Operating speed for calculation of the compensation value is also improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it will be appreciated by those skilled in the art that various modifications and other equivalent embodiments can be made. Accordingly, the scope of the present invention must be determined by the scope of the claims and equivalents, not by the described embodiments.

What is claimed is:

1. A display device comprising:
   a plurality of pixels;
   a memory configured to store a lookup table of compensation values for pixels at only non-adjacent locations among the plurality of pixels and substitution values for bilinear compensation values; and
   a data compensator configured to calculate the bilinear compensation values corresponding to locations where an image signal is displayed, wherein the calculation is performed with a bilinear compensation method using the lookup table of compensation values for pixels at only non-adjacent locations and the substitution values, wherein the substitution values are determined by a bit shift to avoid the usage of a division operator in the data compensator, and wherein the image signal is generated by adding the bilinear compensation values to an uncompensated image signal at corresponding locations,
   wherein the data compensator performs the bilinear compensation method using the following equation:

$g = a + (b-a)K1 >> 16 \text{ bit} \times x + (c-a)K2 >> 16 \text{ bit} \times y + (a+d-b-c)K3 >> 32 \text{ bit} \times xy$ wherein g denotes a compensation value corresponding to a location where the image signal is displayed, a, b, c, and d denote compensation values included in the lookup table, x and y denote a location value indicating a location where the image signal is displayed, >>16 bit denotes 16 bit shifts, >>32 bit denotes 32 bit shifts, and K1, K2, and K3 are substitution values,
   wherein the substitution value K1 is $$K1 = \frac{2^{16}}{W},$$

the substitution value K2 is $$K2 = \frac{2^{16}}{H},$$

the substitution value K3 is $$K3 = \frac{2^{32}}{HW},$$

wherein W denotes the number of pixels arranged between two pixels respectively corresponding to a compensation value a and a compensation value b included in the lookup table, and H denotes the number of pixels arranged between two pixels corresponding to the compensation value a and a compensation value c included in the lookup table.

2. The display device of claim 1, wherein the data compensator comprises a plurality of adders, a plurality of multipliers, and bit shifters.

3. The display device of claim 2, wherein the data compensator has eight adders and seven multipliers.

4. The display device of claim 3, wherein the bit shifters comprise:
   a first bit shifter and a second bit shifter performing 16 bit shifts; and
   a third bit shifter performing 32 bit shifts.

5. The display device of claim 2, wherein the plurality of adders comprise:
   a first adder adding a first compensation value and a second compensation value;
   a second adder adding the first compensation value and a third compensation value;
   a third adder adding the first compensation value and the second compensation value;
   a fourth adder adding the third compensation value and a fourth compensation value; and
   a fifth adder adding a calculation value of the third adder and a calculation value of the fourth adder,
   wherein the first to fourth compensation values are a plurality of compensation values stored in the lookup table.

6. The display device of claim 5, wherein the plurality of multipliers comprise:
   a first multiplier multiplying a calculation value of the first adder by a first location value;
   a second multiplier multiplying the calculation value of the first multiplier by a second location value;
   a third multiplier multiplying a calculation value of the second adder by a second location value;

a fourth multiplier multiplying a calculation value of the third multiplier by a second substitution value;
a fifth multiplier multiplying the first location value by the second location value;
a sixth multiplier multiplying a calculation value of the fifth adder by a calculation value of the fifth multiplier; and
a seventh multiplier multiplying a calculation value of the sixth multiplier by a third substitution value, and
the location value comprises the first location value and the second location value and the substitution value comprises the first to third substitution values.

7. The display device of claim 6, wherein the bit shifter comprises:
a first bit shifter, 16 bit shifting a calculation value of the second multiplier;
a second bit shifter, 16 bit shifting a calculation value of the fourth multiplier; and
a third bit shifter, 32 bit shifting a calculation value of the seventh multiplier.

8. The display device of claim 7, wherein the plurality of adders further comprise:
a sixth adder adding the first compensation value and a calculation value of the first bit shifter;
a seventh adder adding a calculation value of the sixth adder and a calculation value of the second bit shifter; and
an eighth adder adding a calculation value of the seventh adder and a calculation value of the third bit shifter.

9. The display device of claim 1, wherein the data compensator is provided as an integrated circuit chip.

10. The display device of claim 1, wherein the memory is provided as an electrically erasable programmable read-only memory.

11. The display device of claim 1, wherein the compensation values correspond to gamma values compensating for mura.

12. An integrated circuit chip comprising:
a plurality of adders performing addition between a plurality of bilinear compensation values for pixels at only non-adjacent locations stored in a lookup table, wherein the compensation values are added to an uncompensated image signal at corresponding locations so as to generate an image signal;
a plurality of multipliers multiplying location values by location values or by substitution values; and
bit shifters bit-shifting, by a number of predetermined bits, values generated by the multipliers
wherein the adders, the multipliers and the bit shifters are configured to perform a bilinear compensation method using the following equation:

$g=a+(b-a)K1>>16$ bit$\times x+(c-a)K2>>16$ bit$\times y+(a+d-b-c)K3>>32$ bit$\times xy$ wherein g denotes a compensation value corresponding to a location where the image signal is displayed, a, b, c, and d denote compensation values included in the lookup table, x and y denote a location value indicating a location where the image signal is displayed, >>16 bit denotes 16 bit shifts, >>32 bit denotes 32 bit shifts, and K1, K2, and K3 are substitution values,
wherein the substitution value K1 is $$K1 = \frac{2^{16}}{W},$$

the substitution value K2 is $$K2 = \frac{2^{16}}{H},$$

the substitution value K3 is $$K3 = \frac{2^{32}}{HW},$$

wherein W denotes the number of pixels arranged between two pixels respectively-corresponding to a compensation value a and a compensation value b included in the lookup table, and H denotes the number of pixels arranged between two pixels corresponding to the compensation value a and a compensation value c included in the lookup table.

13. The IC chip of claim 12, wherein the plurality of adders comprise:
a first adder adding a first compensation value and a second compensation value;
a second adder adding the first compensation value and a third compensation value;
a third adder adding the first compensation value and the second compensation value;
a fourth adder adding the third compensation value and a fourth compensation value; and
a fifth adder adding a calculation value of the third adder and a calculation value of the fourth adder,
wherein the first to fourth compensation values are the plurality of compensation values stored in the lookup table.

14. The IC chip of claim 13, wherein the plurality of multipliers comprise:
a first multiplier multiplying a calculation value of the first adder by a first location value;
a second multiplier multiplying a calculation value of the first multiplier by a first substitution value;
a third multiplier multiplying a calculation value of the second adder by a second location value;
a fourth multiplier multiplying a calculation value of the third multiplier by a second substitution value;
a fifth multiplier multiplying the first location value by the second location value;
a sixth multiplier multiplying a calculation value of the fifth adder by a calculation value of the fifth multiplier; and
a seventh multiplier multiplying a calculation value of the sixth multiplier by a third substitution value, and
the location values comprise the first location value and the second location value and the substitution values comprises the first to third substitution values.

15. The IC chip of claim 14, wherein the bit shifters comprise:
a first bit shifter, 16 bit shifting a calculation value of the second multiplier;
a second bit shifter, 16 bit shifting a calculation of the fourth multiplier; and
a third bit shifter, 32 bit shifting a calculation value of the seventh multiplier.

16. The IC chip of claim 15, wherein the plurality of adders further comprise:
a sixth adder adding the first compensation value and a calculation value of the first bit sifter;

a seventh adder adding a calculation value of the sixth adder and a calculation value of the second bit shifter; and an eighth adder adding a calculation value of the seventh adder and a calculation value of the third bit shifter.

17. The IC chip of claim 12, wherein the number of predetermined bits is 16 and 32.

18. The IC chip of claim 12, wherein the bit shifters comprise a first bit-shifter, bit-shifting by 16 bits, a second bit-shifter bit-shifting by 16 bits, and a third bit-shifter, bit-shifting by 32 bits.

19. The IC chip of claim 12, wherein the compensation values correspond to gamma values compensating for mura.

* * * * *